US010635463B2

(12) United States Patent
Kataria et al.

(10) Patent No.: US 10,635,463 B2
(45) Date of Patent: Apr. 28, 2020

(54) ADAPTING THE TONE OF THE USER INTERFACE OF A CLOUD-HOSTED APPLICATION BASED ON USER BEHAVIOR PATTERNS

(71) Applicant: International Business Machines Corporation, Armonk, NY (US)

(72) Inventors: Manish Kataria, Delhi (IN); Manu Kuchhal, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 15/602,585

(22) Filed: May 23, 2017

(65) Prior Publication Data

US 2018/0341377 A1 Nov. 29, 2018

(51) Int. Cl.
*G06F 8/65* (2018.01)
*G06F 9/451* (2018.01)

(52) U.S. Cl.
CPC .............. *G06F 9/454* (2018.02); *G06F 8/65* (2013.01)

(58) Field of Classification Search
CPC ..... G06F 8/71; G06F 8/38; G06F 8/65; G06F 11/3003; G06F 9/44536; G06F 11/3438
See application file for complete search history.

(56) References Cited

U.S. PATENT DOCUMENTS

| 7,024,365 | B1* | 4/2006 | Koff | G06F 9/454 704/270.1 |
| 7,620,894 | B1* | 11/2009 | Kahn | G06F 3/0481 715/707 |
| 7,792,661 | B1* | 9/2010 | Cooley | G06F 11/3466 702/185 |
| 2002/0107684 | A1* | 8/2002 | Gao | G06F 8/51 704/4 |

(Continued)

OTHER PUBLICATIONS

Reinecke, K. Automatic Adaptation of User Interfaces to Cultural Preferences, Computer Science & Engineering at the University of Washington, 2012.

(Continued)

*Primary Examiner* — Justin S Lee
(74) *Attorney, Agent, or Firm* — Ryan, Mason & Lewis, LLP (57) ABSTRACT

Methods, systems, and computer program products for adapting the tone of the user interface of a cloud-hosted application based on user behavior patterns are provided herein. A computer-implemented method includes analyzing behavior of a user with respect to one or more software applications; automatically detecting, from a pre-established collection of multiple software tone settings, one or more appropriate software tone settings to be applied to the one or more software applications based on the analyzed behavior; dynamically updating the software tone settings of the one or more software applications, wherein updating comprises (i) defining the value for one or more strings of the one or (Continued)

more software applications as one or more run-time attributes and (ii) resolving the one or more run-time attributes upon detecting the one or more appropriate software tone settings; and outputting the one or more dynamically updated software applications to at least a display.

19 Claims, 7 Drawing Sheets

(56) References Cited

U.S. PATENT DOCUMENTS

| | | | |
|---|---|---|---|
| 2003/0046401 A1* | 3/2003 | Abbott | G06F 9/451 709/228 |
| 2006/0004680 A1* | 1/2006 | Robarts | G06F 1/163 706/12 |
| 2008/0077384 A1* | 3/2008 | Agapi | G06F 9/454 704/2 |
| 2009/0089775 A1* | 4/2009 | Zusman | G06F 8/65 717/173 |
| 2009/0307693 A1* | 12/2009 | Do | G06F 9/4843 718/100 |
| 2011/0321028 A1* | 12/2011 | Evans | G06F 8/61 717/170 |
| 2014/0035945 A1* | 2/2014 | Anglin | G06F 3/14 345/619 |
| 2014/0089824 A1* | 3/2014 | George | G06F 8/38 715/762 |
| 2015/0026824 A1* | 1/2015 | Kim | H04W 4/029 726/28 |
| 2015/0058744 A1* | 2/2015 | Dhingra | G06F 9/451 715/747 |
| 2016/0260017 A1* | 9/2016 | Jo O Viol Vieira | H04L 67/06 |
| 2017/0239486 A1* | 8/2017 | Suryavanshi | G06F 19/00 |

OTHER PUBLICATIONS

Vanderdonckt et al. Multi-Model and Multi-Level Development of User Interfaces, Aug. 18, 2005.

IBM, Tone Analyzer, https://web.archive.org/web/20170304044834/ https://www.ibm.com/watson/developercloud/tone-analyzer.html, Mar. 4, 2017.

* cited by examiner

FIG. 7 ated by keys.
ADAPTING THE TONE OF THE USER INTERFACE OF A CLOUD-HOSTED APPLICATION BASED ON USER BEHAVIOR PATTERNS

FIELD

The present application generally relates to information technology, and, more particularly, to user engagement technology.

BACKGROUND

Existing user engagement models generally focus on localization, in an attempt to ensure that the software in question speaks the language with which the end user is familiar. This aspect is particularly important in software as a service (SaaS) based models, wherein the end users (or organizations) have no control or involvement in software installation or language selection. Vendors and/or developers often use a typical internationalization strategy, which includes externalizing all of the key strings to language files. At run-time, a system implementing such a strategy might attempt to gauge the user location, based on the loading of the correct language file, which replaces the place-holders represented by keys.

Another collaboration trait which can make the software interaction intuitive for an end user is the tone of the software. Some users are may be more comfortable with strict professional tones, while other users might appreciate a light humor-based tone. Tone can reflect the attitude of the collaborator (software, in this context) towards consumers or end users, and can be expressed through word choice. The aspect of tone is often ignored by existing software development techniques, resulting in software that is commonly monotonous and/or less appealing for certain users, even though such users might understand the interactive text from a language perspective.

SUMMARY

In one embodiment of the present invention, techniques for adapting the tone of the user interface of a cloud-hosted application based on user behavior patterns are provided. An exemplary computer-implemented method can include analyzing behavior of a user with respect to one or more software applications; automatically detecting, from a pre-established collection of multiple software tone settings, one or more appropriate software tone settings to be applied to the one or more software applications based on the analyzed behavior; dynamically updating the software tone settings of the one or more software applications, wherein updating comprises (i) defining the value for one or more strings of the one or more software applications as one or more run-time attributes and (ii) resolving the one or more run-time attributes upon detecting the one or more appropriate software tone settings; and outputting the one or more dynamically updated software applications to at least a display.

In another embodiment of the invention, an exemplary computer-implemented method can include generating a first user interface prompt for user selection, from a collection of multiple software language settings, of one or more software language settings to be associated with a set of one or more software applications, and generating a second user interface prompt for user selection, from a collection of multiple software tone settings, of one or more software tone settings to be associated with a set of one or more software applications. Such a method also includes loading, into the one or more software applications, (i) the one or more user-selected software language settings and (ii) the one or more user-selected software tone settings, and outputting the one or more software applications to at least a display.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes automatically detecting and adapting the tone (for example, the language style used for interacting with the end-user) of a user interface (UI) and/or software application based on the behavior and/or interactions of the user with the user interface/software application. Within the context of one or more embodiments of the invention, user behavior can include any contribution to the software by the user, and/or any interaction between the user and the software, resulting in the creation of a digital footprint. Such activity might include, for example, writing one or more blogs, one or more wikis, one or more emails, carrying out one or more instant messaging (IM) chats, contributing to a team room, providing one or more recommendations and/or comments, sharing of existing content, etc. As also further detailed herein, the tone of a UI and/or software application can be expressed, for example, through word choice in connection with provided content. Possible tone settings can include a serious tone, a solemn tone, a critical tone, a cynical tone, a humorous tone, a satiric tone, a sarcastic tone, etc.

At least one embodiment of the invention can include dynamically adapting the tone of a UI and/or software application by analyzing a user's pattern of behavior with respect to the UI/software application and/or the content contributed (to the UI/software application) by the user to identify one or more appropriate tones for that specific user. Such an embodiment can also include discarding the existing/loaded tone bundles from the UI/software application, and loading the new appropriate tones to the UI/software application once a change is detected. Such loading can be carried out within the same instance of the UI/software application at run-time.

Further, by way of example, a UI layer can be subscribed to a tone change event, and all of the strings and navigational patterns can be refreshed based on the information contained in the new event. As used herein, strings refer to the text the user sees on a software's interface, error messages, warnings, etc. Additionally, as used herein, a navigational pattern refers to the steps on a user interface that a user has to perform for a particular functionality. By way of example, in a formal tone setup, software may decide to show all warnings to the user before allowing a user operation. In an informal setup, software can merely allow an indicator of warnings via a button (and to show more details upon selection of the button), but allow for the user operation directly.

Additionally, one or more embodiments of the invention can include deciding on a language tone in addition to one or more language preferences. The language tone selection can be carried out via explicit selection by the user, or by using an automatic tone selector module and recommending one or more tone settings for the user after analyzing multiple factors in the relevant content of the UI/software application. At least one embodiment of the invention can also include providing access to various digital footprints for any software/tools associated with the specific user. Such an embodiment includes leveraging the digital footprint to detect tone preferences of the end-user, as well as dynamically changing a tone preference at any time. As such, one or more embodiments of the invention can include accessing such digital content, which may be present locally or on an external collaboration platform.

Figure 1:
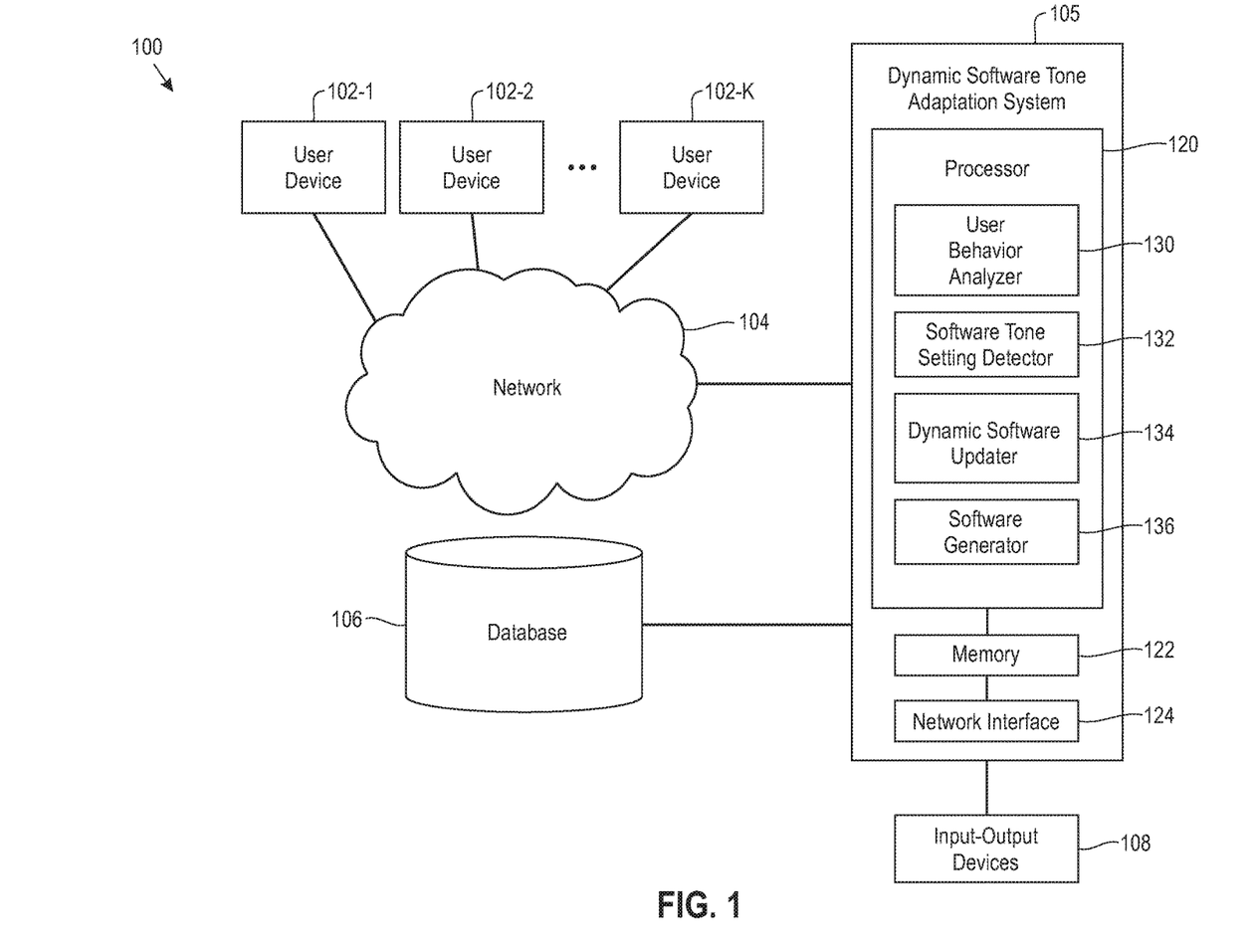
FIG. 1 is a diagram illustrating system architecture, according to an exemplary embodiment of the invention.

FIG. 1 is a diagram illustrating system architecture, according to an embodiment of the invention. By way of illustration, FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a dynamic software tone adaptation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The dynamic software tone adaptation system 105 has an associated database 106 configured to store data characterizing user behavior associated with each of a plurality of software tone settings.

The database 106 in the present embodiment is implemented using one or more storage systems associated with the dynamic software tone adaptation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dynamic software tone adaptation system 105 are input-output devices 108, which illustratively comprise keyboards, displays or other types of input-output devices in any combination. Such input-output devices are used to support one or more user interfaces to the dynamic software tone adaptation system 105, as well as to support communication between the dynamic software tone adaptation system 105 and other related systems and devices not explicitly shown.

The dynamic software tone adaptation system 105 in the FIG. 1 embodiment is implemented using at least one processing device. Each such processing device generally comprises at least one processor and an associated memory, and implements one or more functional modules for controlling certain features of the dynamic software tone adaptation system 105.

More particularly, the dynamic software tone adaptation system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the dynamic software tone adaptation system 105 to communicate over the network 104 with the user devices 102, and illustratively comprises one or more conventional transceivers.

The processor 120 further comprises a user behavior analyzer 130, a software tone setting detector 132, a dynamic software updater 134 and a software generator 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the user behavior analyzer 130, software tone setting detector 132, dynamic software updater 134 and software generator 136 may be implemented at least in part in the form of software that is stored in memory 122 and executed by processor 120.

It is to be understood that the particular set of elements shown in FIG. 1 for automatically detecting and implementing appropriate software tone settings involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the dynamic software tone adaptation system 105 can be eliminated and associated elements such as user behavior analyzer 130, software tone setting detector 132, dynamic software updater 134 and software generator 136 can be implemented elsewhere in the computer network 100.

An exemplary process utilizing user behavior analyzer 130, software tone setting detector 132, dynamic software updater 134 and software generator 136 of the dynamic software tone adaptation system 105 in computer network 100 will be described in more detail with reference to the flow diagrams of FIG. 2, FIG. 3, and FIG. 4.

Figure 2:
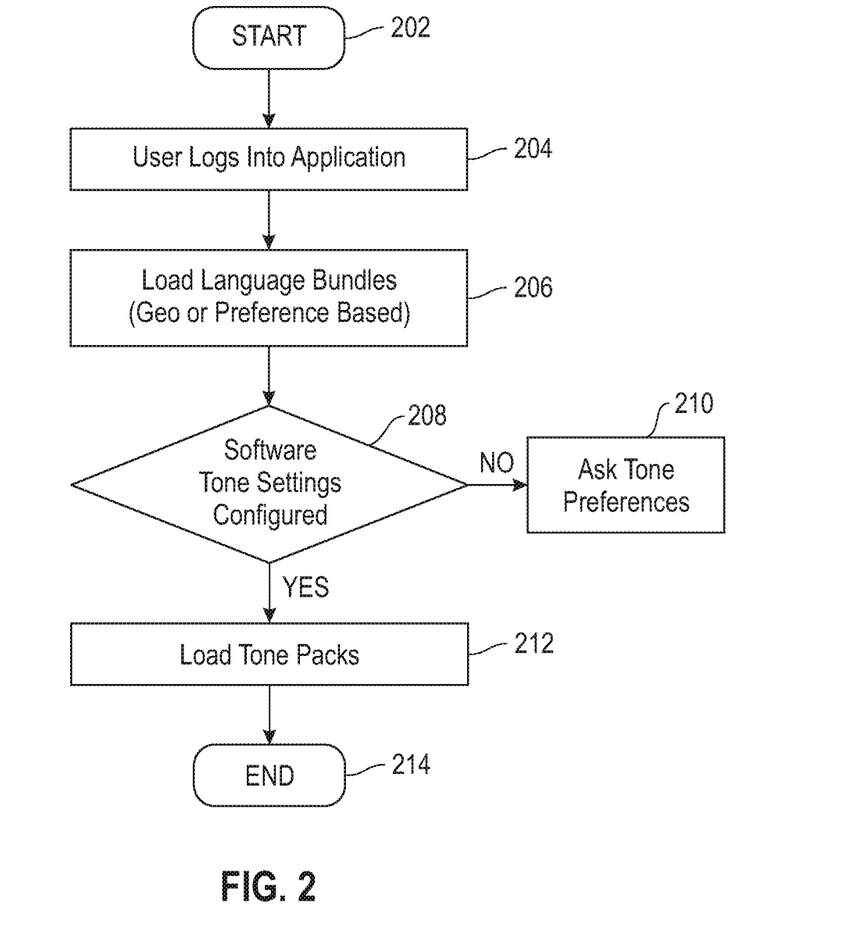
FIG. 2 is a diagram illustrating manual tone selection, according to an exemplary embodiment of the invention.

FIG. 2 is a diagram illustrating manual tone selection, according to an exemplary embodiment of the invention. Step 202 includes starting the process, while step 204 includes the user logging into a given application. Step 206 includes loading language bundles (which can be geographically-based and/or preference-based), and step 208 includes determining whether the software tone settings are configured. If no (that is, the software tone settings are not configured), then the user is asked for tone preferences in step 210. If yes (that is, the software tone settings are configured), then the selected/configured tone packs are loaded into the software application in step 212, and the process ends in step 214.

Figure 3:
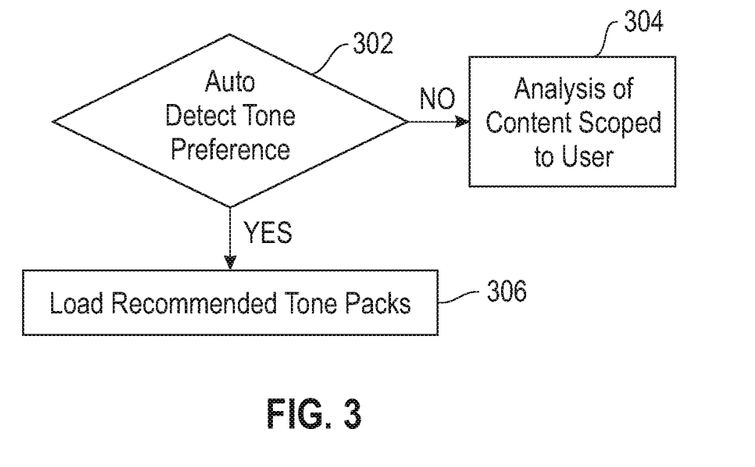
FIG. 3 is a diagram illustrating automatic selection of language tone via a tone selector system, according to an exemplary embodiment of the invention.

FIG. 3 is a diagram illustrating automatic selection of language tone via a tone selector system, according to an exemplary embodiment of the invention. Step 302 includes determining whether a tone preference has been automatically detected. If no (that is, the tone preference has not been automatically detected), then content scoped to the user is analyzed in step 304. If yes (that is, the tone preference has been automatically detected), then the recommended tone packs are loaded into the software application(s) in step 306.

In automatically learning tone preferences associated, for example, with software and/or tools that are hosted on an enterprise cloud, at least one embodiment of the invention can include accessing digital footprints associated with the given user (using, for example, the user's single sign-on (SSO) credentials). In such a scenario, a digital footprint can be scanned and analyzed using one or more tone analyzer application programming interfaces (APIs).

Figure 4:
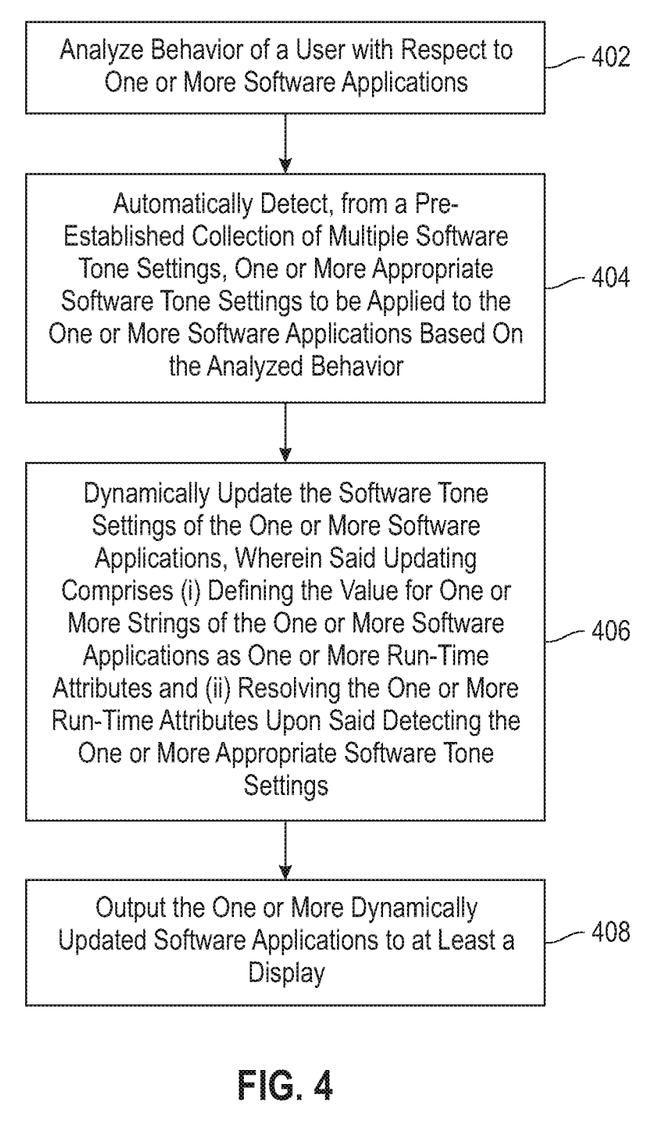
FIG. 4 is a flow diagram illustrating techniques according to an embodiment of the invention.

FIG. 4 is a flow diagram illustrating techniques according to an embodiment of the present invention. Step 402 includes analyzing behavior of a user with respect to one or more software applications. The behavior of the user can include content generated by the user via the one or more software applications, content shared by the user via the one or more software applications, and/or one or more geographical considerations pertaining to the user's use of the one or more software applications.

Step 404 includes automatically detecting, from a pre-established collection of multiple software tone settings, one or more appropriate software tone settings to be applied to the one or more software applications based on the analyzed behavior. The collection of multiple software tone settings can include a serious tone setting, a solemn tone setting, a critical tone setting, a cynical tone setting, a humorous tone setting, a satiric tone setting, and/or a sarcastic tone setting.

Step 406 includes dynamically updating the software tone settings of the one or more software applications, wherein said updating comprises (i) defining the value for one or more strings of the one or more software applications as one or more run-time attributes and (ii) resolving the one or more run-time attributes upon said detecting the one or more appropriate software tone settings. Updating can also include caching the one or more resolved run-time attributes, as well as removing one or more existing software tone settings of the one or more software applications. Additionally, at least one embodiment of the invention can include designating the one or more strings for value-defining and/or designating one or more strings of the one or more software applications as precluded from value-defining. Examples of strings that might be precluded from value-defining can include, for instance, product branding, and entity names such as organizations, departments, teams, employee names, etc.

Also, in at least one embodiment of the invention, the value for the one or more strings is not known a priori to a developer of the one or more software applications. Additionally, defining the value for the one or more strings can include retrieving the value from one or more external sources over a network. By way of illustration, consider the following example:

Compile time (de.solem.properties)
moreApp=Show more applications . . .
Run time (de.humor.dynamic)
moreApp=watson.humor("more apps").

Step 408 includes outputting the one or more dynamically updated software applications to at least a display. At least one embodiment of the invention can also include enabling a feedback mechanism, whereby the user provides feedback pertaining to the dynamically updated software. Additionally, one or more embodiments of the invention can include repeating step 402, step 404, step 406 and step 408 at a pre-determined temporal interval.

The techniques depicted in FIG. 4 can also include analyzing the software tone settings of the one or more software applications in connection with one or more additional users, wherein the user and the one or more additional users are all part of a given group. Additionally, one or more embodiments of the invention can include identifying one or more patterns across the given group, wherein the one or more patterns pertain to the software tone settings of the one or more software applications.

Also, an additional embodiment of the invention includes generating a first user interface prompt for user selection, from a collection of multiple software language settings, of one or more software language settings to be associated with a set of one or more software applications, and generating a second user interface prompt for user selection, from a collection of multiple software tone settings, of one or more software tone settings to be associated with a set of one or more software applications. Such an embodiment can also include loading, into the one or more software applications, (i) the one or more user-selected software language settings and (ii) the one or more user-selected software tone settings, and outputting the one or more software applications to at least a display.

At least one embodiment of the invention (such as the techniques depicted in FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives user behavior information sent from a data source to the transmission server. The server can process the information, for example, based upon user-provided user preference information that is stored in memory on the server. Subsequently, an alert is generated containing the appropriate software tone setting information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
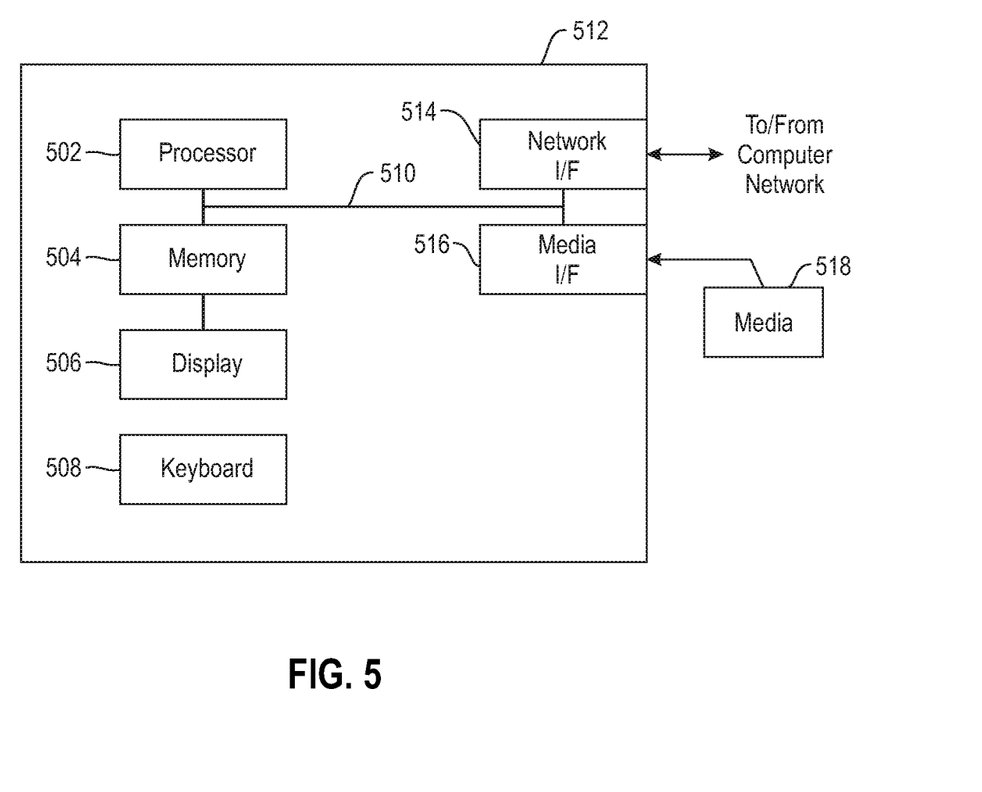
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
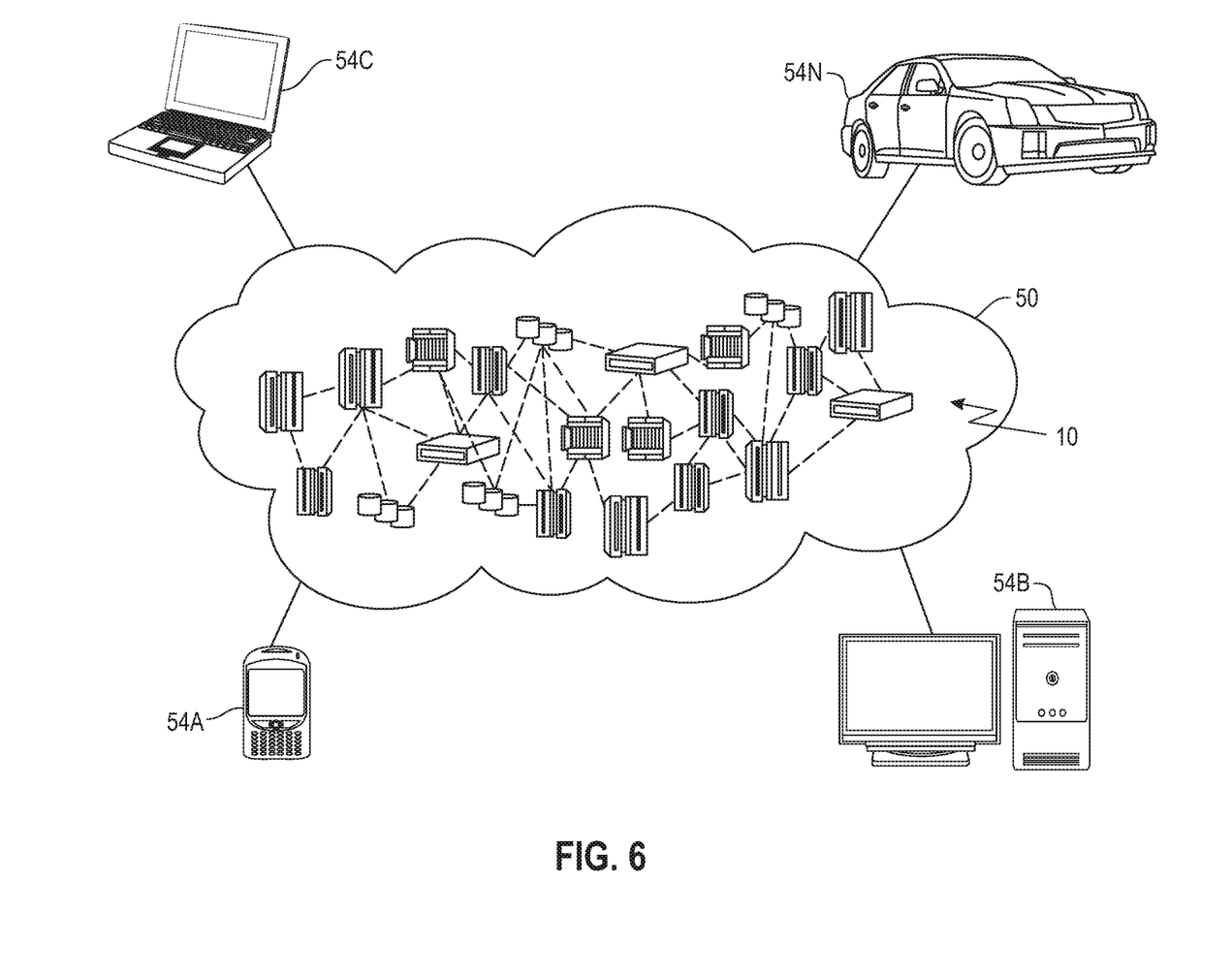
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
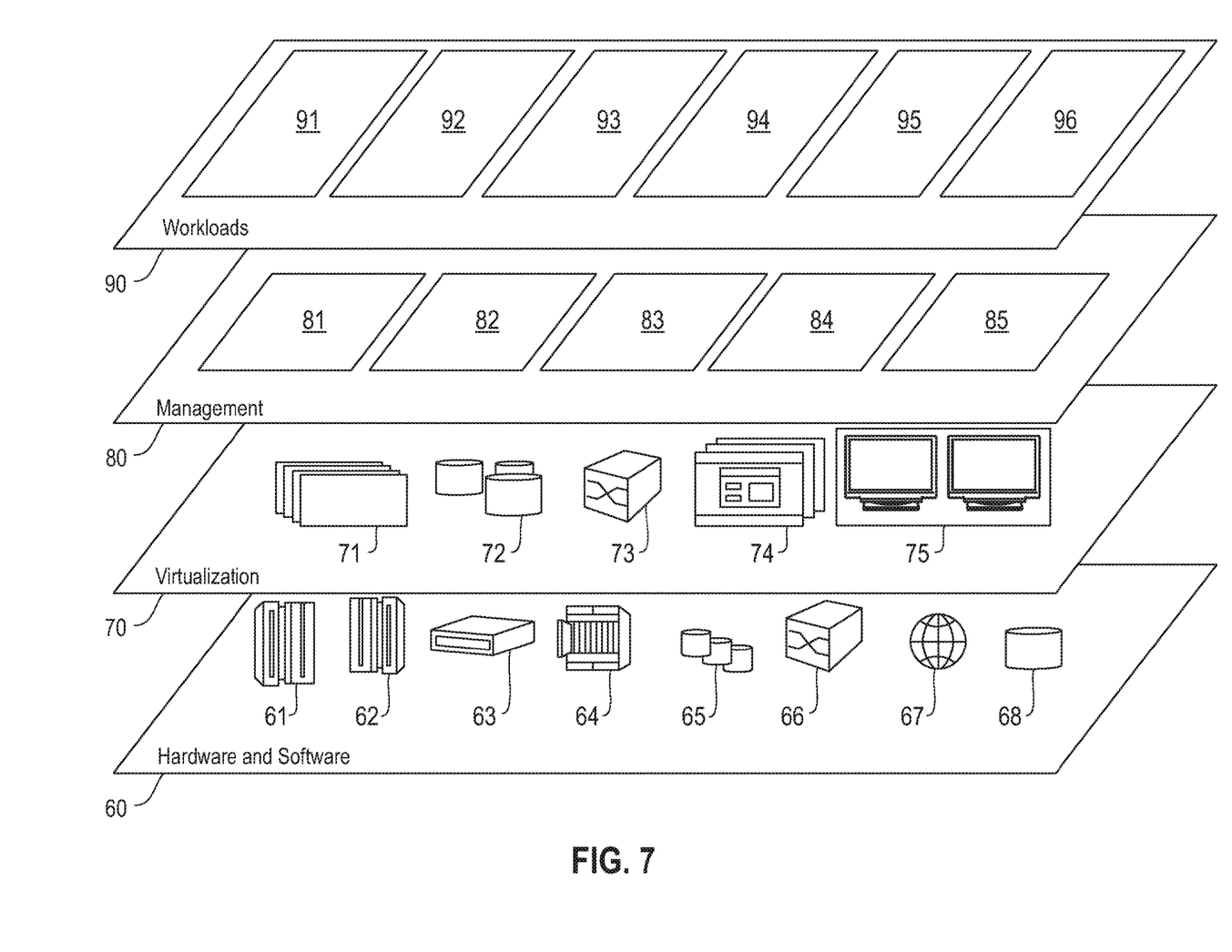
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic tone adaptation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically detecting and adapting the tone of a UI and/or software application based on the behavior and/or interactions of the user with the user interface/software application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically adapting software tone, the method comprising steps of:

analyzing behavior of a user with respect to one or more software applications, wherein said analyzing comprises analyzing at least (i) user interaction of the user and (ii) textual content corresponding to the user, wherein said analyzing comprises:

accessing one or more digital footprints associated with the user using one or more single sign-on credentials attributed to the user; and analyzing the one or more digital footprints using one or more application programming interfaces;

automatically detecting, from a pre-established collection of multiple software tone settings, one or more appropriate software tone settings to be applied to the one or more software applications based on the analyzed behavior;

dynamically updating the software tone settings of the one or more software applications, wherein said updating comprises (i) defining the value for one or more strings of the one or more software applications as one or more run-time attributes, (ii) designating one or more of the strings that pertain to product branding and entity names as precluded from value-defining, and (iii)

resolving the one or more run-time attributes upon said detecting the one or more appropriate software tone settings; and outputting one or more of the strings of the one or more software applications to at least a display based on the updated software tone settings;

wherein the method is carried out by at least one computing device.

2. The computer-implemented method of claim 1, wherein the behavior of the user comprises generation, by the user, of the textual content via the one or more software applications.

3. The computer-implemented method of claim 1, wherein the behavior of the user comprises sharing, by the user, of the textual content via the one or more software applications.

4. The computer-implemented method of claim 1, wherein the behavior of the user comprises one or more geographical considerations pertaining to the user's use of the one or more software applications.

5. The computer-implemented method of claim 1, wherein the collection of multiple software tone settings comprises a serious tone setting, a solemn tone setting, a critical tone setting, a cynical tone setting, a humorous tone setting, a satiric tone setting, and a sarcastic tone setting.

6. The computer-implemented method of claim 1, wherein said updating comprises caching the one or more resolved run-time attributes.

7. The computer-implemented method of claim 1, comprising:
designating the one or more strings for said defining.

8. The computer-implemented method of claim 1, wherein said updating comprises removing one or more existing software tone settings of the one or more software applications.

9. The computer-implemented method of claim 1, comprising:
analyzing the software tone settings of the one or more software applications in connection with one or more additional users.

10. The computer-implemented method of claim 9, wherein the user and the one or more additional users are all part of a given group.

11. The computer-implemented method of claim 10, comprising:
identifying one or more patterns across the given group, wherein the one or more patterns pertain to the software tone settings of the one or more software applications.

12. The computer-implemented method of claim 1, comprising:
enabling a feedback mechanism, whereby the user provides feedback pertaining to the dynamically updated software.

13. The computer-implemented method of claim 1, comprising:
repeating (i) said analyzing, (ii) said automatically detecting, (iii) said dynamically updating, and (iv) said outputting at a pre-determined temporal interval.

14. The computer-implemented method of claim 1, wherein the value for the one or more strings is not known a priori to a developer of the one or more software applications.

15. The computer-implemented method of claim 1, wherein said defining the value for the one or more strings comprises retrieving the value from one or more external sources over a network.

16. A computer program product comprising a computer readable storage medium having program instructions embodied therewith, the program instructions executable by a device to cause the device to:
analyze behavior of a user with respect to one or more software applications, wherein said analyzing comprises analyzing at least (i) user interaction of the user and (ii) textual content corresponding to the user, wherein said analyzing comprises:
accessing one or more digital footprints associated with the user using one or more single sign-on credentials attributed to the user; and
analyzing the one or more digital footprints using one or more application programming interfaces;
automatically detect, from a pre-established collection of multiple software tone settings, one or more appropriate software tone settings to be applied to the one or more software applications based on the analyzed behavior;
dynamically update the software tone settings of the one or more software applications, wherein said updating comprises (i) defining the value for one or more strings of the one or more software applications as one or more run-time attributes, (ii) designating one or more of the strings that pertain to product branding and entity names as precluded from value-defining, and (iii) resolving the one or more run-time attributes upon said detecting the one or more appropriate software tone settings; and
output one or more of the strings of the one or more software applications to at least a display based on the updated software tone settings.

17. The computer program product of claim 16, wherein the program instructions executable by a computing device further cause the computing device to:
analyze the software tone settings of the one or more software applications in connection with one or more additional users.

18. A system comprising:
a memory; and
at least one processor operably coupled to the memory and configured for:
analyzing behavior of a user with respect to one or more software applications, wherein said analyzing comprises analyzing at least (i) user interaction of the user and (ii) textual content corresponding to the user, wherein said analyzing comprises:
accessing one or more digital footprints associated with the user using one or more single sign-on credentials attributed to the user; and
analyzing the one or more digital footprints using one or more application programming interfaces;
automatically detecting, from a pre-established collection of multiple software tone settings, one or more appropriate software tone settings to be applied to the one or more software applications based on the analyzed behavior;
dynamically updating the software tone settings of the one or more software applications, wherein said updating comprises (i) defining the value for one or more strings of the one or more software applications as one or more run-time attributes, (ii) designating one or more of the strings that pertain to product branding and entity names as precluded from value-defining, and (iii) resolving the one or more run-time attributes upon said detecting the one or more appropriate software tone settings; and outputting one or more of the strings of the one or more software applications to at least a display based on the updated software tone settings.

19. The computer program product of claim 16, wherein the behavior of the user comprises at least one of:
   generation, by the user, of the textual content via the one or more software applications; and
   sharing, by the user, of the textual content via the one or more software applications.

\* \* \* \* \*